US007857868B2

(12) United States Patent
Leitner et al.

(10) Patent No.: US 7,857,868 B2
(45) Date of Patent: Dec. 28, 2010

(54) ELECTRODE AND METHOD FOR PREPARING THE SAME USING SUBSTRATE INDUCED COAGULATION (SIC)

(75) Inventors: Klaus Werner Leitner, Graz (AT); Juergen Otto Besenhard, Graz (AT); Kai-Christian Moeller, Graz (AT); Martin Winter, Graz (AT); Ki-Young Lee, Daejeon (KR); Seong-Yong Park, Daejeon (KR); Joong-Hee Han, Graz (AT); Robert Bernhard Gollas, Graz (AT)

(73) Assignee: LG Chem, Ltd. (KR)

( * ) Notice: Subject to any disclaimer, the term of this patent is extended or adjusted under 35 U.S.C. 154(b) by 1427 days.

(21) Appl. No.: 10/538,227

(22) PCT Filed: May 17, 2005

(86) PCT No.: PCT/KR2005/001442
§ 371 (c)(1),
(2), (4) Date: Jun. 8, 2005

(87) PCT Pub. No.: WO2005/112151
PCT Pub. Date: Nov. 24, 2005

(65) Prior Publication Data
US 2006/0263687 A1    Nov. 23, 2006

Related U.S. Application Data

(60) Provisional application No. 60/571,842, filed on May 17, 2004.

(30) Foreign Application Priority Data
May 17, 2005    (KR) .......................... 2005-0041033

(51) Int. Cl.
- H01M 4/82    (2006.01)
- H01M 6/00    (2006.01)
- H01M 4/60    (2006.01)
- H01M 4/02    (2006.01)
- H01M 4/36    (2006.01)
- H01M 4/58    (2006.01)

(52) U.S. Cl. ...................... 29/623.5; 427/115; 429/212; 429/530; 429/231.95

(58) Field of Classification Search ................. 427/202, 427/115; 29/623.1, 623.5; 429/42, 212, 429/530, 231.95
See application file for complete search history.

(56) References Cited

U.S. PATENT DOCUMENTS 5,133,594 A    7/1992    Haas et al. .................. 359/275

(Continued)

FOREIGN PATENT DOCUMENTS

CN    1207589    2/1999

(Continued)

OTHER PUBLICATIONS

K. W. Leitner et al., "Binder-Free" Supercap Electrodes Processed From High Surface Area Fine Particulate Carbon Black, 2002 Advanced Batteries and Accumulators (ABA 2002)—Reports, pp. 29-1-29-3, Jun. 16-20, 2005, Institute of Chemical Technology of Inorganic Materials.

(Continued)

*Primary Examiner*—Patrick Ryan
*Assistant Examiner*—Julian Mercado
(74) *Attorney, Agent, or Firm*—Cantor Colburn LLP (57) ABSTRACT

The present invention is related to an electrode and a method for preparing the same, and is particularly related to an electrode that has an intricate structure of active material layer, conductive material layer, or mixture layer of active material and conductive material that displays superior electrochemical properties despite being thin, and a method for preparing an electrode using the coating method of SIC.

12 Claims, 7 Drawing Sheets

U.S. PATENT DOCUMENTS

| | | | | |
|---|---|---|---|---|
| 5,589,297 A | * | 12/1996 | Koga et al. | 429/212 |
| 5,705,219 A | | 1/1998 | Besenhard et al. | 427/96 |
| 5,916,485 A | | 6/1999 | Besenhard et al. | 252/511 |
| 6,235,182 B1 | | 5/2001 | Bele et al. | |
| 6,372,386 B1 | | 4/2002 | Cho et al. | |
| 7,566,479 B2 | * | 7/2009 | Besenhard et al. | 427/376.2 |

FOREIGN PATENT DOCUMENTS

| | | |
|---|---|---|
| CN | 1328104 | 12/2001 |
| EP | 0 228 573 | 7/1987 |
| JP | 63-055853 A | 3/1988 |
| JP | 05-029022 | 2/1993 |
| JP | 07-507000 A | 8/1995 |
| JP | 08-273671 | 10/1996 |
| JP | 11-250916 A | 9/1999 |
| JP | 2000-208136 A | 7/2000 |
| KR | 10-2000-0031312 | 6/2000 |
| TW | 511315 | 11/2002 |
| WO | WO 92/00315 | 1/1992 |
| WO | WO 92/19092 | 10/1992 |
| WO | WO 02/19442 A1 | 3/2002 |

OTHER PUBLICATIONS

K.W. Leitner, et al., Proceedings of the 12th International Seminar on Double Layer Capacitors; pp. 1-11, 2002 vol. PT PP.

M. Bele, et al., "Substrate-induced coagulation of carbon black on gelatine-modified printed wiring board surfaces", Physicochemical and Engineering Aspects 143 (1998), pp. 17-26.

M. Bele, et al., "Substrate-induced deposition of carbon black particles from aqueous dispersion on gelatin-modified surface", Physicochemical and Engineering Aspects 168 (2000), pp. 231-239.

* cited by examiner

ELECTRODE AND METHOD FOR PREPARING THE SAME USING SUBSTRATE INDUCED COAGULATION (SIC)

CROSS REFERENCE TO RELATED APPLICATION

This application claims priority to and the benefit of U.S. Provisional Patent Application No. 60/571,842, filed on May 17, 2004 and Korean Patent Application No. 10-2005-0041033 filed on May 17, 2005, which are hereby incorporated by reference for all purposes as if fully set forth herein

FIELD OF THE INVENTION

The present invention is related to an electrode and a method for preparing the same. In particular, it is related to an electrode that displays superior electrochemical properties, and a method for preparing an electrode that has formed layers of active material and conductive material using the coating method of Substrate Induced Coagulation (SIC).

BACKGROUND OF THE INVENTION

Electrical elements such as batteries, supercapacitors, and fuel cells contain electrodes which generate electric currents through electrochemical reactions.

A typical electrode contains an active material which confers the property of cathode or anode, a conductive material to enhance conductivity, and is in the form of having a composite mixture of the active material and conductive material attached to the current collector through a binder.

Typically, the method of forming a layer of active material and conductive material on the electrode has been to prepare a slurry of active material and conductive material with a binder by mixing in a solvent, then directly coating the surface of the current collector with this slurry.

However, electrodes prepared by the conventional slurry coating methods are not suitable for the development of high performance electrical elements. This is because in the conventional method, the active material and conductive material are physically attached using a binder, which leads to some active material and conductive material becoming buried in the binder, resulting in less contact between the particles of active material or conductive material.

SUMMARY OF THE INVENTION

In order to solve such problems in the art, the object of the present is to provide an electrode having superior electrochemical properties with thin and uniform coating layers of active material, conductive material, or mixture thereof.

The other object of the present invention is to provide a method for preparing the electrode by coating layers of active material, conductive material, or mixture thereof on the electrode substrate with substrate induced coagulation (SIC) method.

To accomplish the object, the present invention provides an electrode containing a) an electrode substrate; b) an active material; c) a conductive material; and d) a polyelectrolyte which attaches the active material and conductive material to the electrode substrate.

Furthermore, the present provides a method for preparing the electrode which includes a step of coating a layer of active material, a layer of conductive material, or a composite layer of mixture thereof onto the surface of the electrode substrate using the SIC coating method.

BRIEF DESCRIPTION OF THE DRAWINGS

The accompanying drawing, which is included to provide further understanding of the invention and is incorporated in and constitutes a part of this specification, illustrates an embodiment of the invention and together with the description serves to explain the principles of the invention.

DETAILED DESCRIPTION OF THE PREFERRED EMBODIMENTS

Generally, the thinner the electrodes in an electrical element, the better the electrochemical properties displayed by the electrical element. However, the thickness of the electrode cannot easily be decreased since the amount of active material and conductive material contained in the electrode must be maintained at a proper level. In order to prepare a thin electrode containing proper amounts of active material and conductive material, it is necessary to develop a method which can coat the active material and conductive material more elaborately.

The inventors of the present invention have previously proposed an SIC coating method of preparing a composite substance with superior conductivity by implanting a small amount of conductive substance (see: WO/92/00315, "Colloids Surfaces A: Physicochem. Eng. Aspects 143 (1998) 17", "Colloids Surfaces A: Physicochem. Eng. Aspects 168 (200) 231", and "Proceedings of The 12$^{th}$ International Seminar on Double Layer Capacitors, Florida Education Seminars Inc. (2002)").

Furthermore, U.S. Pat. No. 5,916,485 describes a method of preparing conducting composite particles coated with a conductive material, by implanting a conductive substance on the surface of powdered forms of nonconductive substances or poorly conductive substances using the SIC coating method, while U.S. Pat. No. 5,705,219 describes a method for preparing printed circuit boards and other items by coating a conductive substance onto the surface of a nonconductive substrate using the SIC coating method. However, no example exists of preparing an electrode where layers of active material and conductive material are formed on the surface of an electrode substrate using the SIC coating method.

The electrode of the present invention differs from electrodes prepared by the conventional slurry coating method in that the active material and conductive material each form its own layer, and has a more elaborate structure than the active material layer of conventional electrodes, and displays superior performance even with a smaller thickness.

The electrode of the present invention includes a) electrode substrate, b) active material, c) conductive material, and d) polyelectrolyte which attach the active material and the conductive material to the electrode substrate.

The electrode substrate is not particularly limited, and is preferably a current collector used in conventional electrodes, and is more preferably a current collector containing at least one selected from the group consisting of stainless steel, copper, titan, aluminum, and ITO. Furthermore, the current collector is not limited by the roughness of its surface. Thus, the electrode of the present invention can include both rough- and smooth-surfaced current collectors as electrode substrates.

Preferably the active material is at least one active material selected from the group consisting of lithium titanate, lithium colbaltate, and lithium manganate, and the above active material can be a form where a part of the titanium, cobalt, or manganese is substituted by another metal.

However, it is preferable that the active material particles have an average particle diameter of 10 μm or less, more preferably have an average particle diameter of 10 nm to 1 μm, and most preferably have an average particle diameter of 100 nm to 200 nm. When the average particle diameter of the active material is over 10 μm, the coating becomes less effective.

Preferably the conductive material is a conductive substance in a fine powder form, and although it is not particularly limited to certain substances, it is preferably at least one selected from the group consisting of carbon black and activated carbon.

The polyelectrolyte is conceptually different from the binder conventionally used in preparing electrodes, and has the function of attaching the active material and conductive material to the surface of the electrode substrate. When the surface of the electrode substrate is conditioned with a conditioning solution containing a polyelectrolyte, the polyelectrolyte functions as a coagulation initiator on the surface of the electrode substrate, and the active material and conductive material attaches to the surface of the electrode substrate through intermolecular forces between the polyelectrolyte and active material or conductive material. Thus, the coagulation force between the polyelectrolyte attached to the surface of the electrode substrate and active material or conductive material is the crucial factor that determines coating performance.

Preferably the polyelectrolyte is one or more polymer selected from the group consisting of i) water-soluble polymers, ii) cationically charged polyelectrolytes, iii) uncharged water-soluble macromolecules, and iv) anionically charged high molecular weight materials.

In particular, the water-soluble polymer is preferably one or more compounds selected from the group consisting of gelatin, polyacrylates carrying ammonium groups, and albumins.

The cationically charged polyelectrolyte is preferably one or more compounds selected from the group consisting of copolymers of acrylamides or methacrylamides with salts, and quaternary products of aminoacrylates or other polyelectrolytes carrying simple or substituted ammonium groups. This type of compounds are usually called 'flocculants' and examples are Superfloc (American Cyanamid), Etadurin (Akzo), Sedipur (BASF), Magnafloc (Allid Colloids), Nalcolyte (Nalco), Sanfloc (Sanyo), and Separan (Dow Chemical).

The uncharged water-soluble macromolecule is preferably one or more compounds selected from the group consisting of polyacrylamides, polyvinylpyrrolidones, polyvinylalcohols, polyethylene glycols, polyethylene glycol ether, epichlorohydrin-imidazole adduct, polyvinyl imidazoles, polysaccarides such as agar, starch, pectin, and dextran, and polysaccharide such as alginic acid.

The anionically charged high molecular weight material is preferably one or more compounds selected from the group consisting of sodium salts of carboxymethylcellulose, sodium salts of alginic acid, a copolymer of mannuronic acid and glucuronic acid, alkali salts of polycarboxylic acid such as polyacrylic acid, and polyvinylphosphoric acid.

An electrode with active material and conductive material attached by the polyelectrolyte can be of the form where the active material layer and the conductive material layer is arranged alternately one or more times, and the electrode substrate, the active material layer, and the conductive material layer are attached by the polyelectrolyte.

Figure 1:
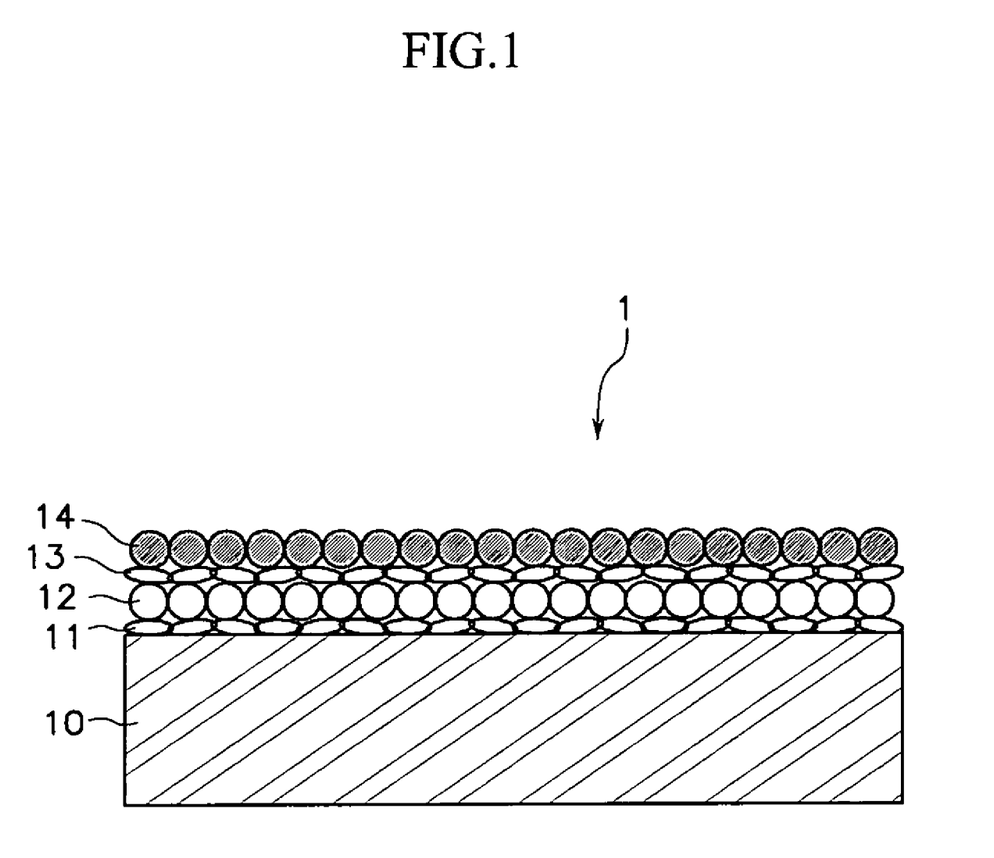
FIG. 1 is a cross-sectional view showing a first embodiment of an electrode of the present invention.

FIG. 1 is a cross-sectional view showing Example 1 of the electrode 1 of the present invention where the electrode substrate 10, polyelectrolyte 11, active material layer 12, polyelectrolyte 13, and conductive material layer 14 are deposited layer by layer. However, the electrode of the present invention is not limited to the form shown in FIG. 1, and the number and order of layers of the active material layer and the conductive material layer deposited can vary.

However, in the electrode of Example 1 as shown in FIG. 1, the active material layers 12 preferably has a thickness of 10 nm to 10 μm, more preferably have a thickness of 10 nm to 1 μm, and most preferably have a thickness of 100 nm to 200 nm.

Also, the conductive material layer 14 preferably has a thickness of 10 nm to 5 μm, and more preferably have a thickness of 0.5 μm to 2 μm.

If the thickness of the active material layer is less than 10 nm the electrode function is lost. If it is greater than 10 μm, there is insufficient adhesion and electrode capacity. Furthermore, if the thickness of the conductive material layer is less than 10 nm, the conductivity falls and the electrical property is decreased. If it is greater than 5 μm, adhesion to the electrode is not good.

Figure 2:
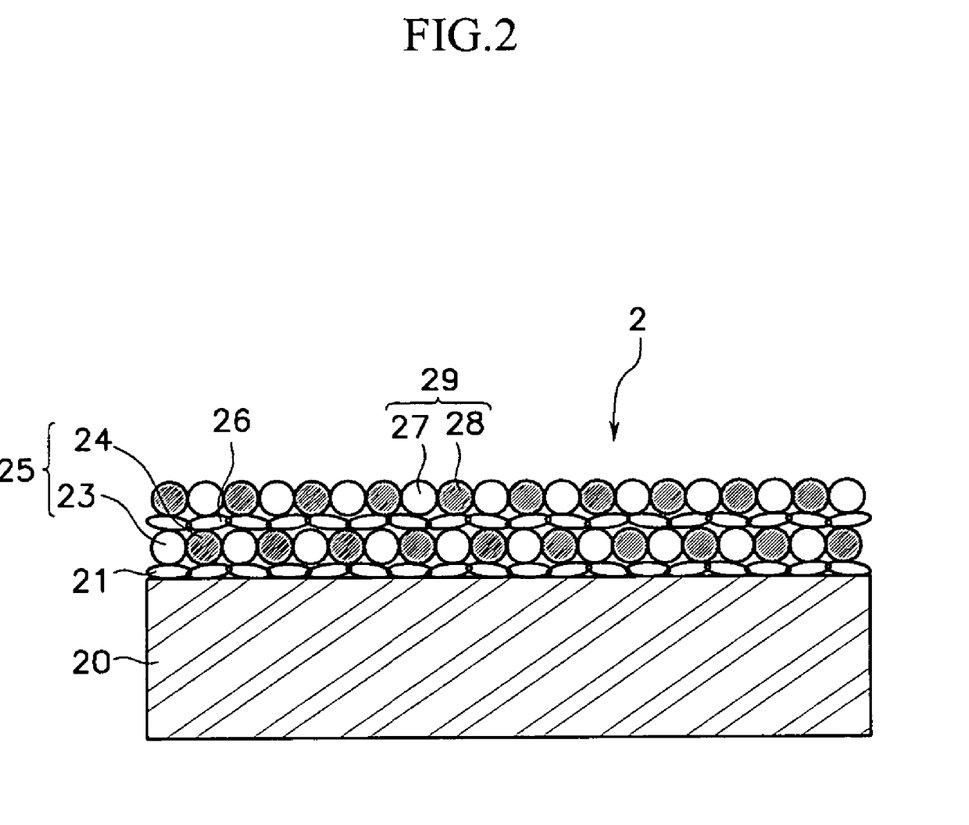
FIG. 2 is a cross-sectional view showing a second embodiment of an electrode of the present invention.

The electrode of the present invention can take the form of having one or more layers of a mixture including an active material and a conductive material attached to the surface of the electrode substrate by the polyelectrolyte. FIG. 2 is a cross-sectional view showing Example 2 of the electrode 2 of the present invention where polyelectrolyte 21 and a composite layer 25 of active material 23 and conductive material 24, polyelectrolyte 26, and a composite layer 29 including active material 27 and conductive material 28 are deposited on the surface of the electrode substrate 20.

In the electrode of Example 2 as shown in FIG. 2, the composite layers 25 and 29 including active material and conductive material preferably has a thickness of 10 nm to 10 μm, more preferably has a thickness of 10 nm to 1 μm, and most preferably has a thickness of 100 nm to 200 nm. If the thickness of the mixture layer is less than 1 nm, the electrical property is decreased. If it is greater than 10 μm, there is insufficient adhesion and electrode capacity.

The electrode of the present invention is suitable for use as an electrode in batteries, supercapacitors, and fuel cells, because the active material layer, conductive material layer, or the composite layer including active material and conductive material are structurally intricate and can display superior electrochemical properties despite being thin.

Figure 3:
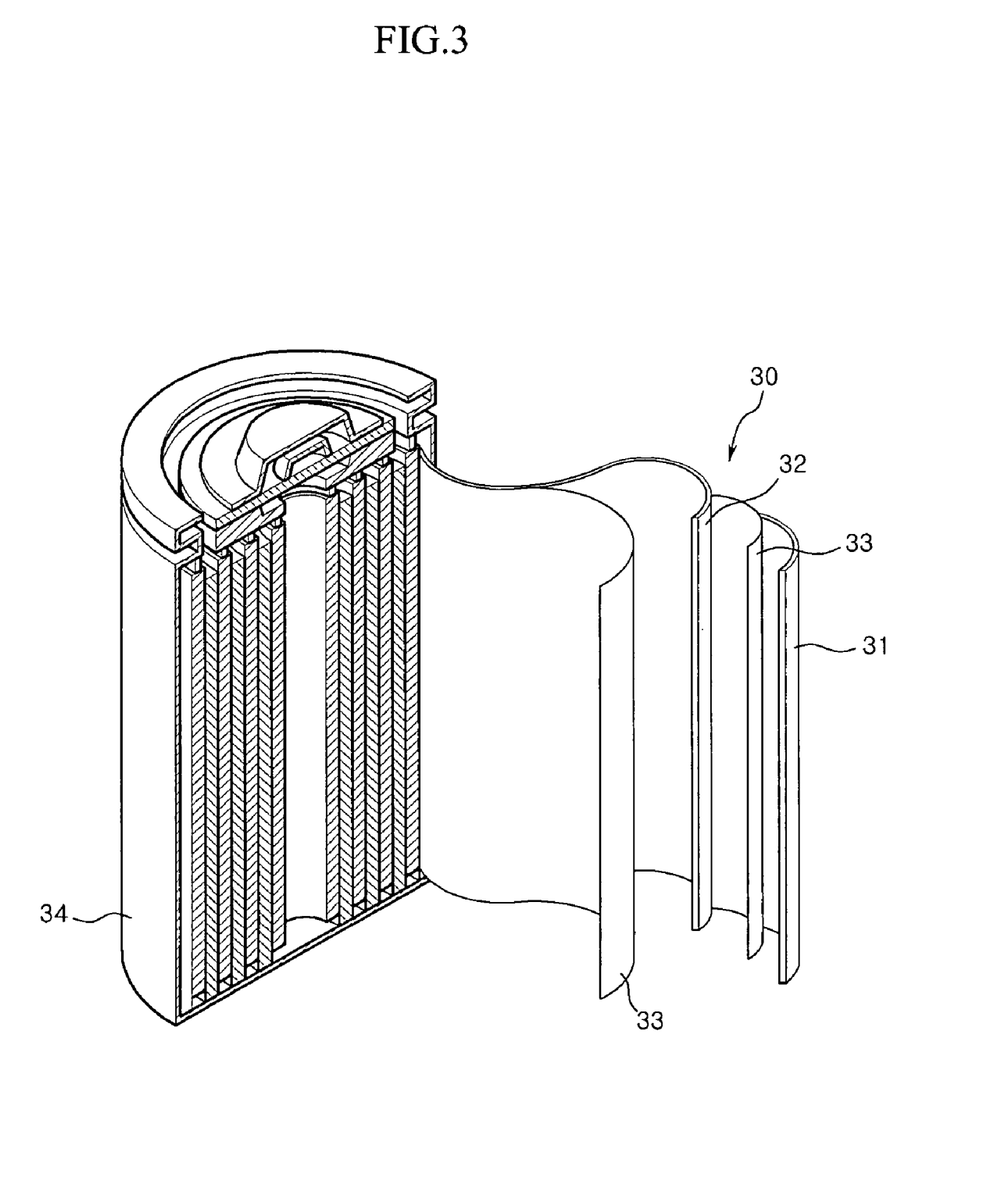
FIG. 3 is a partial exploded perspective view of a lithium secondary battery comprising the electrode of the present invention.

FIG. 3 is a partial exploded perspective view of an example of a lithium secondary battery containing the electrode of the present invention. A lithium secondary battery 3 is composed of an anode 31, a cathode 32, a separator 33 placed between the anode 31 and the cathode 32, an electrolyte in which the anode 31, cathode 32 and separator 33 are immersed, a tubular battery container 34 as the main parts. Such a lithium secondary battery can have the anode 31, cathode 32, and separator 33 layered in sequence and put into the battery container 34 in a spirally rolled up form. The electrode of the present invention can be used in the anode and cathode of the above lithium secondary battery.

The electrode of the present invention can be prepared by the method of preparing an active material layer, conductive material layer, or a composite layer including active material and conductive material on the surface of the electrode substrate using the substrate induced coagulation (SIC) coating method.

The SIC coating method described in WO92/019092 (Oct. 29, 1992) can be applied to preparation of the electrode of the present invention. So aside from what is described below, the detailed principles and other conditions of the SIC coating method follows that described in WO92/019092.

The SIC coating method utilizes the intermolecular forces between the surface of the substrate conditioned with polyelectrolyte and the particles of active material or conductive material dispersed in the solvent, and the coagulation force between the polyelectrolyte attached to the substrate surface and the particles of active material or conductive material is the crucial factor that determines coating performance.

The SIC coating method of the present invention includes the steps of a) conditioning the surface of the electrode substrate with a conditioning solution containing a first solvent and a polyelectrolyte; and b) treating the conditioned surface of the electrode substrate with i) active material, conductive material, or a mixture thereof, ii) a second solvent, iii) a surfactant, and iv) a dispersion containing an electrolyte.

The method can further include the steps of rinsing the surface with deionized water after conditioning with the conditioning solution and after treating with the dispersion.

In the present invention, details regarding the electrode substrate, polyelectrolyte, active material, and conductive material used are the same as those described above, so a detailed description will not be given.

However, the first solvent is not particularly limited, and is preferably water, and it can also be a polar solvent such as alcohols or ketones, or a mixture of these solvents with water. Here, the water is preferably deionized water.

The concentrations of the first solvent and conditioning solution containing a polyelectrolyte can vary to suit the type of polyelectrolyte, but is preferably 0.001 (w/w) % to 10 (w/w) %, and more preferably 0.01 (w/w) % to 1 (w/w) %. If the concentration of the polyelectrolyte is less than 0.001 (w/w) %, the effect of surface activation as a coagulation initiator is negligible. If it is greater than 10 (w/w) %, any increase in content is meaningless.

The type of the second solvent contained in the dispersion is not particularly limited, but is preferably water, and it can also be a polar solvent such as alcohols or ketones, or a mixture of these solvents with water. Here, the water is preferably deionized water.

The second solvent can be the same as the first solvent used in the conditioning solution, or it can be different.

The active material, conductive material, or a mixture of these contained in the above dispersion is contained in the amount of 0.05 g/L to 10 g/L in relation to the whole dispersion, and more preferably 0.1 g/L to 5 g/L. If the content of the active material, conductive material, or a mixture of these is less than 0.05 g/L then it is difficult to obtain a uniform and fine coating layer, and when it exceeds 10 g/L an increase in content does not increase the effect.

The surfactant prevents coagulating of the active material or the conductive material in the dispersion solution. The surfactant is preferably selected from the group consisting of cationic surfactants, anionic surfactants, non-ionic surfactants, and amphoteric surfactants. However, the surfactant is not limited thereto and can be selected with regard to its compatibility to the active material or conductive material.

The amount of the surfactant in the dispersion solution ranges from 10 mM/L to 100 mM/L, and preferably from 15 mM/L to 50 mM/L. When the amount of the surfactant is less than 10 mM/L, coagulating of the active material or the conductive material can be occurred, and reproducibility of the SIC coating can decrease. When the amount of the surfactant exceeds 100 mM/L, the electrical properties of the electrode can be decreased.

The electrolyte added to the dispersion solution is for partial destabilization of the dispersion and can vary according to need. However the electrolytes is preferably one or more salts selected from the group consisting of fluorides, chlorides, bromides, and iodides of lithium, sodium, potassium, magnesium, calcium, barium, strontium, ammonium, and copper; and nitrates, sulfates, acetates of carboxylic acid. More preferably, the electrolyte is one or more salts selected from the group consisting of $KCl$, $NH_4NO_3$, $CaCl_2$, $K_2SO_4$, and $CH_3CO_2Na$.

The electrolyte should be selected to suit the cation and anion dissociated and in view of where the electrode is used. For example, in the preparation of an electrode used in lithium batteries, it is preferable to avoid using an electrolyte in which $Na+$ and $Cl-$ ions dissociate. The electrolyte can be of one type or a mixture of two or more types.

The amount of electrolyte contained in the dispersion is preferably 0.01 mole/L to 0.1 mole/L, and more preferably around 0.04 mole/L to 0.06 mole/L. When the amount of electrolyte is less than 0.01 mole/L, the dispersion is not destabilized, so that substrate induced coagulation does not occur. When it exceeds 0.1 mole/L, the dispersion itself undergoes quick coagulation and result in flocculation before coating.

Figure 4:
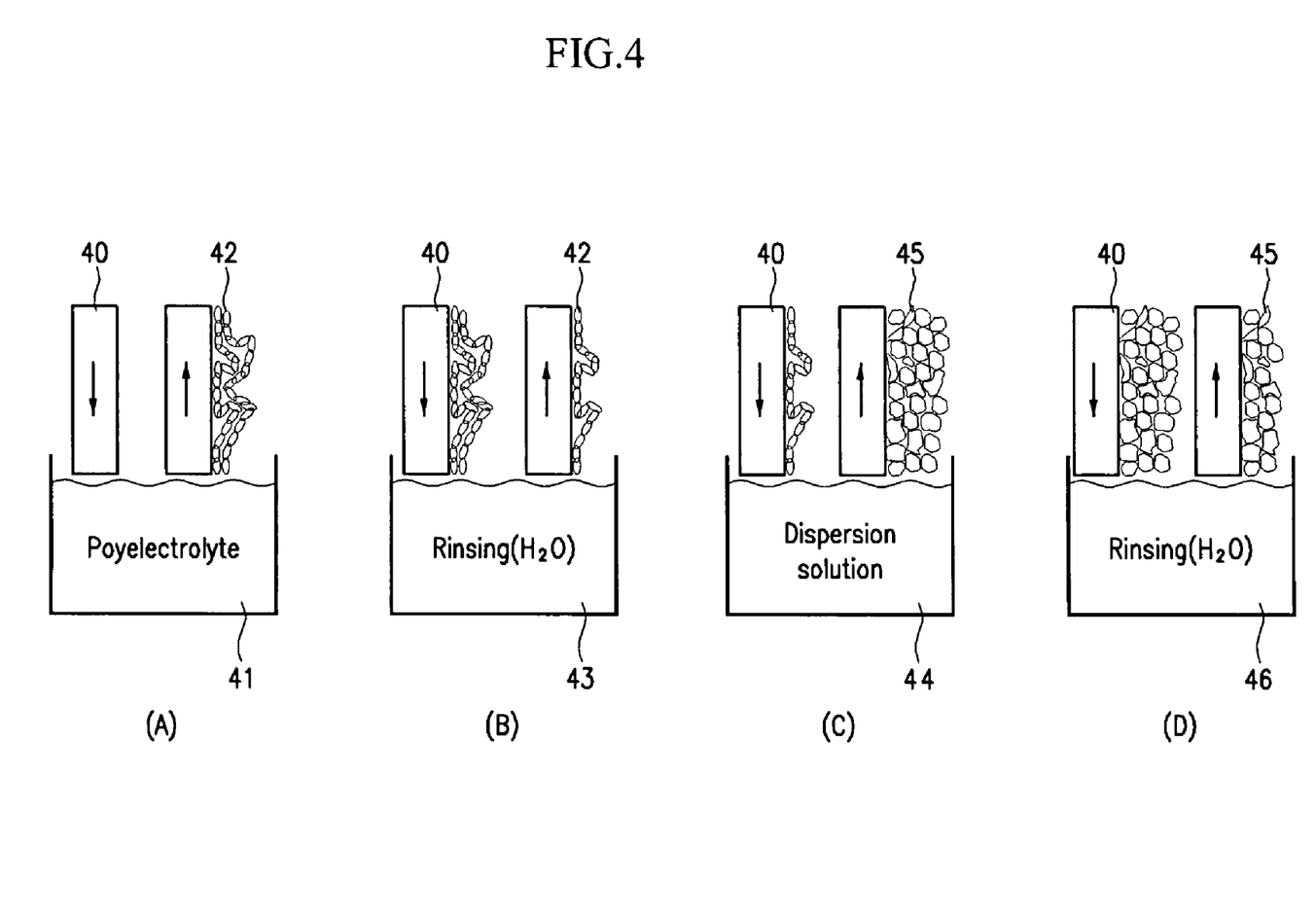
FIG. 4 is a process diagram of the method for preparing the electrode using the SIC method.

FIG. 4 is a process diagram of an illustrative example of the method for preparing the electrode of the present invention through the SIC method. As shown in FIG. 4, when the electrode substrate 40 is immersed in the conditioning solution 41, polyelectrolyte 42 attaches to the surface (step A). When this is rinsed with water 43 (step B), then immersed again in dispersion 44 in which active material, conductive material, or a mixture including active material and conductive material is dispersed, then active material, conductive material, or a the mixture 45 attaches to the surface through intermolecular attraction between the polyelectrolyte and active material or conductive material (step C). This is rinsed with water 46 again to form the coating layer (step D). Such a process is repeated to form the desired thickness and number of layers of active material and conductive material.

Although FIG. 4 illustrates only the most preferable dipping method as an example of conditioning the surface of the electrode substrate with conditioning solution and dispersion, it is illustrative of the invention and does not limit the method of conditioning the surface of the electrode substrate. Various methods such as spraying, coating, or dipping can be used.

The present invention is further explained in more detail with reference to the following examples. These examples, however, should not be interpreted as limiting the scope of the present invention in any manner.

EXAMPLE 1

The current collector of the working electrode (=substrate for the coating process) consists of a stainless steel grid with a geometric area of 10 mm×10 mm.

$Li_4Ti_5O_{12}$ was used as active material and was obtained as nano powder from NEI Corporation (USA).

Carbon black "XE2" (Degussa, Germany) was used as conductive material.

And, deionized water was used in the rinsing after conditioning with the conditioning solution, dispersion solution, and each coating step of SIC coating method.

(Preparing the Conditioning Solution)

Gelatine was dissolved in deionized water at a temperature of 60° C. to obtain an aqueous solution of 0.2 (w/w) % polyelectrolyte. The pH of the gelatine-containing solution was adjusted with aqueous 0.1 M KOH to a value of pH=8.85.

(Preparing a Conductive Material Dispersion Bath)

0.66 g cetyltrimethylammonium bromide was dissolved at room temperature in 100 mL distilled water. 1.00 g of carbon black "Printex XE2" (BET surface 965 $m^2 g^{-1}$), was added and dispersed for 10 min using a turbo mixer (13.000 rpm). Subsequently, 0.41 g $CH_3CO_2Na$ (p.a. grade, Merck, Germany) were added and dissolved. The dispersion was ultrasonicated for 15 min prior to use.

(Preparing an Active Material Dispersion Bath)

The active material dispersion was prepared in the same way as in the above method of preparing the conductive material dispersion, aside from substituting 1.00 g of $Li_4Ti_5O_{12}$ (NEI, USA) for the carbon black.

(SIC Coating)

Using the SIC coating method in the process shown in FIG. 4, an active material layer, and a conductive material layer were formed in sequence on the surface of the prepared electrode substrate.

First, the electrode substrate was immersed for 2 min into the conditioning solution. To assure that the entire surface is covered with polyelectrolyte, the electrode substrate was lightly stirred.

Excess polyelectrolyte bound was rinsed away by dipping two or three times in deionized water.

The conditioned electrode substrate was immersed for two minutes in the active material dispersion in the same way as in the conditioning, and excess active material bound was rinsed away by dipping two or three times in deionized water in coating the active material layer onto the surface of the electrode substrate.

The electrode substrate coated with an active material layer was again immersed for 2 min in the conditioning solution in the same way, then excess polyelectrolyte was rinsed away with deionized water. Then it was immersed for 2 min in the conductive material dispersion in the same way, then excess conductive material was rinsed away with deionized water to form a conductive material layer on the surface of the active material layer.

The prepared current collector was dried at a temperature of 60 to 80° C. to form an electrode with an active material layer, a conductive material layer, and another active material layer in sequence on the surface of the electrode substrate.

The thickness of active material layer, and the conductive material layer in the prepared electrode were 1.5 μm, and 0.75 μm, respectively, and the amount of active material, and conductive material in the prepared electrode were 2.67 $g/m^2$, and 1.46 $g/m^2$, respectively.

EXAMPLE 2

The electrode was prepared substantially according to the same SIC coating method of Example 1, except that a layer of active material and a layer of conductive material were coated by turns, in twice, on the electrode substrate.

The thickness of the layers of active material were 1.5 μm, and 1.5 μm, respectively, and the thickness of the layers of conductive material in the prepared electrode were 0.75 μm, and 0.75 μm, respectively.

Furthermore, the amount of active material, and conductive material in the prepared electrode were 5.33 $g/m^2$, and 2.92 $g/m^2$, respectively.

EXAMPLE 3

The electrode was prepared substantially according to the same SIC coating method of Example 1, except that an aqueous polymer solution of polyvinylalcohol "Mowio18-88" (HOECHST) at a concentration of 0.2 (w/w) % was used as polyelectrolyte and that 0.1M KOH solution was used to adjust the pH of the aqueous polymer solution to 8.85.

The thickness of the active material layer, and the conductive material layer were 0.5 μm, and 0.4 μm, respectively, and the amount of active material, and conductive material in the prepared electrode were 1.3 $g/m^2$, and 0.7 $g/m^2$, respectively.

EXAMPLE 4

The electrode was prepared substantially according to the same SIC coating method of Example 1, except that an aqueous polymer solution of polyacrylamide (ALDRICH) 0.2 (w/w) % was used as polyelectrolyte, and that 0.1M KOH solution was used to adjust the pH of the aqueous polymer solution to 8.85.

However, the active material dispersion and the conductive material dispersion contained 0.2 (w/w) % of Aerosol OT (Cyanamid) as anionic surfactant instead of cetyltrimethylammonium bromide.

The thickness of the active material layer, and the conductive material layer were 0.5 μm, and 0.4 μm, respectively, and the amount of active material, and conductive material in the prepared electrode were 1.2 $g/m^2$, and 0.8 $g/m^2$, respectively.

EXAMPLE 5

The electrode was prepared substantially according to the same SIC coating method of Example 1, except that an aqueous polymer solution of carboxymethylcellulose (FLUKA) 0.2 (w/w) % was used as the polyelectrolyte in the conditioning solution, and that 0.1M KOH solution was used to adjust the pH of the aqueous polymer solution to 8.85.

The thickness of the active material layer, and the conductive material layer were 0.5 μm, and 0.3 μm, respectively, and the amount of active material, and conductive material in the prepared electrode were 1.2 $g/m^2$, and 0.8 $g/m^2$, respectively.

EXAMPLE 6

The electrode was prepared substantially according to the same SIC coating method of Example 1, except that 0.5 g carbon black "Printex XE2" (BET surface 965 $m^2 g^{-1}$) and 0.5 g $Li_4Ti_5O_{12}$ (NEI, USA) was used in the dispersion solution to prepare a mixture solution of active material and conductive material, and that the coating step was carried out twice.

The thickness of the layers of mixture including active material and conductive material were 1.5 μm, and 1.5 μm, respectively, and the total amount of the mixture were 4.13 g/m².

COMPARATIVE EXAMPLE 1

91 parts by weight of lithium titanate ($Li_4Ti_5O_{12}$) (NEI Corporation, USA), 6 parts by weight of the conductive material graphite KS6 (Lonza G+T), and 3 parts by weight of the binder polyvinylidenefluoride (PVdF, Aldrich) was mixed with the solvent NMP (Aldrich) and slowly stirred for 24 hours to prepare a slurry having a honey-like consistency.

The prepared active material slurry was coated onto the 10 mm×10 mm stainless steel grid (electrode substrate) with a pipette. The slurry-coated electrode was pre-dried for 2 h at 120° C. Finally, the electrode was dried under vacuum for 24 h at 120° C. The dried electrode was not pressed or calendered.

The thickness of the coated layer of active material was 20 μm, and the total amount of the active material and conductive material were 71.6 g/m².

It can be seen that the electrode of Examples 1 to 6 which were prepared by the SIC coating method has a thinner and more uniform coating layer compared to the electrode of Comparative Example 1 which is prepared by the conventional slurry coating method.

The electrodes prepared according to Example 1 and Comparative Example 1 were dried in vacuum for 24 hours at 120° C. Then each were made into a half cell with a ethylene carbonate: diethyl carbonate mixed solvent (EC:DEC=1:1) containing 1M concentration of $LiClO_4$ as the electrolyte.

Figure 5:
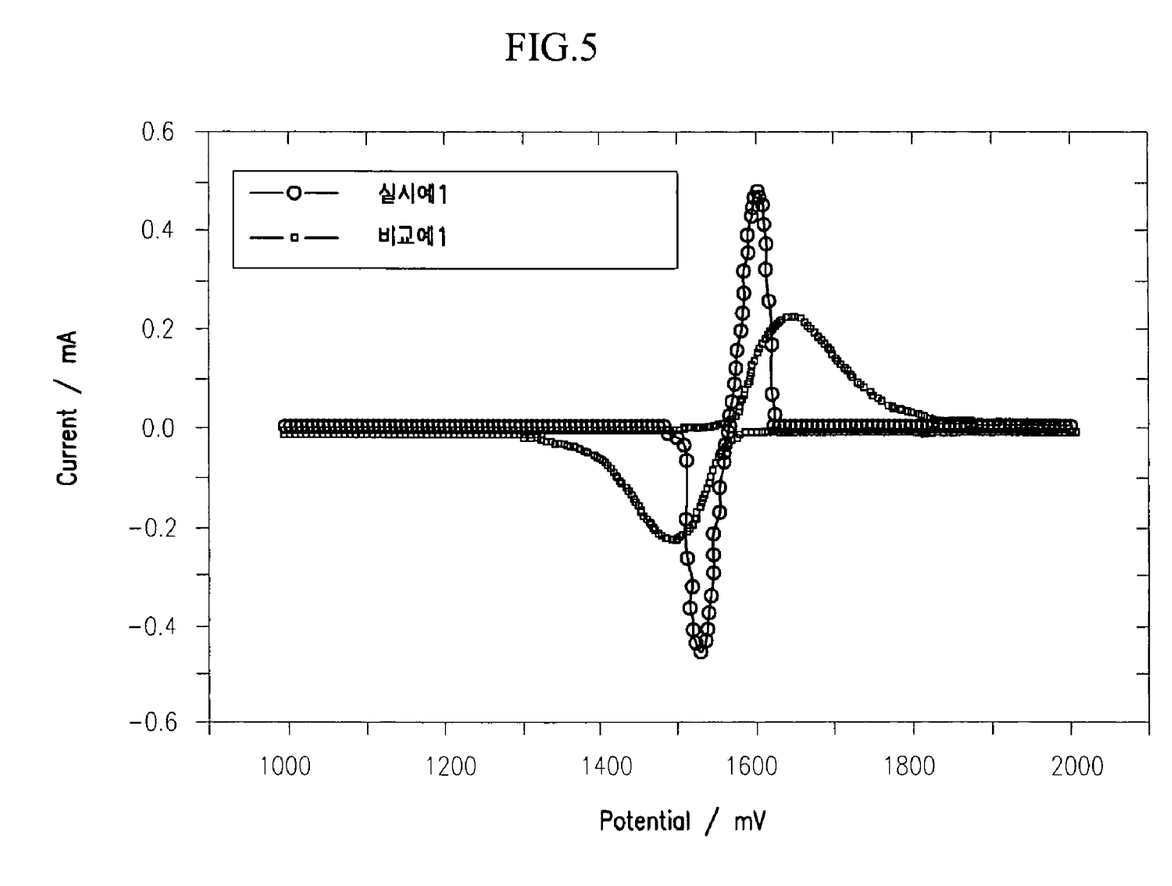
FIG. 5 is a cyclic voltammogram ($v=50$ $\mu V$ $s^{-1}$) of the electrodes prepared according to Example 1 and Comparative Example 1.

Cyclic voltammograms (CVs) of the half cells were recorded with an Adesys Electrochemical Research Station Model 1612 at the rate of 50 μV s$^{-1}$ in a potential range of 1000 to 2000 mV vs. Li/Li$^+$, and the results are shown in FIG. 5.

Cyclic voltammetry experiments started at open circuit potential (OCP). The measurements were carried out at room temperature (25±2° C.) in a glove box containing an Argon atmosphere.

As shown in FIG. 5, both electrodes of Example 1 and Comparative Example 1 show a chemically reversible peak pair at 1550 mV vs. Li/Li$^+$. However, the electrode prepared according to Example 1 exhibits obviously better kinetics indicated by a sharper pair of peaks and a smaller difference between the anodic and cathodic peak potential.

Furthermore, constant current charge- and discharge-cycling in the electrode prepared according to Example 1 was performed with the same equipment as mentioned above. For cycling the current was set to 0.1, and 10.0 C-rate, and other conditions were the same as for measurement of CVs.

Figure 6:
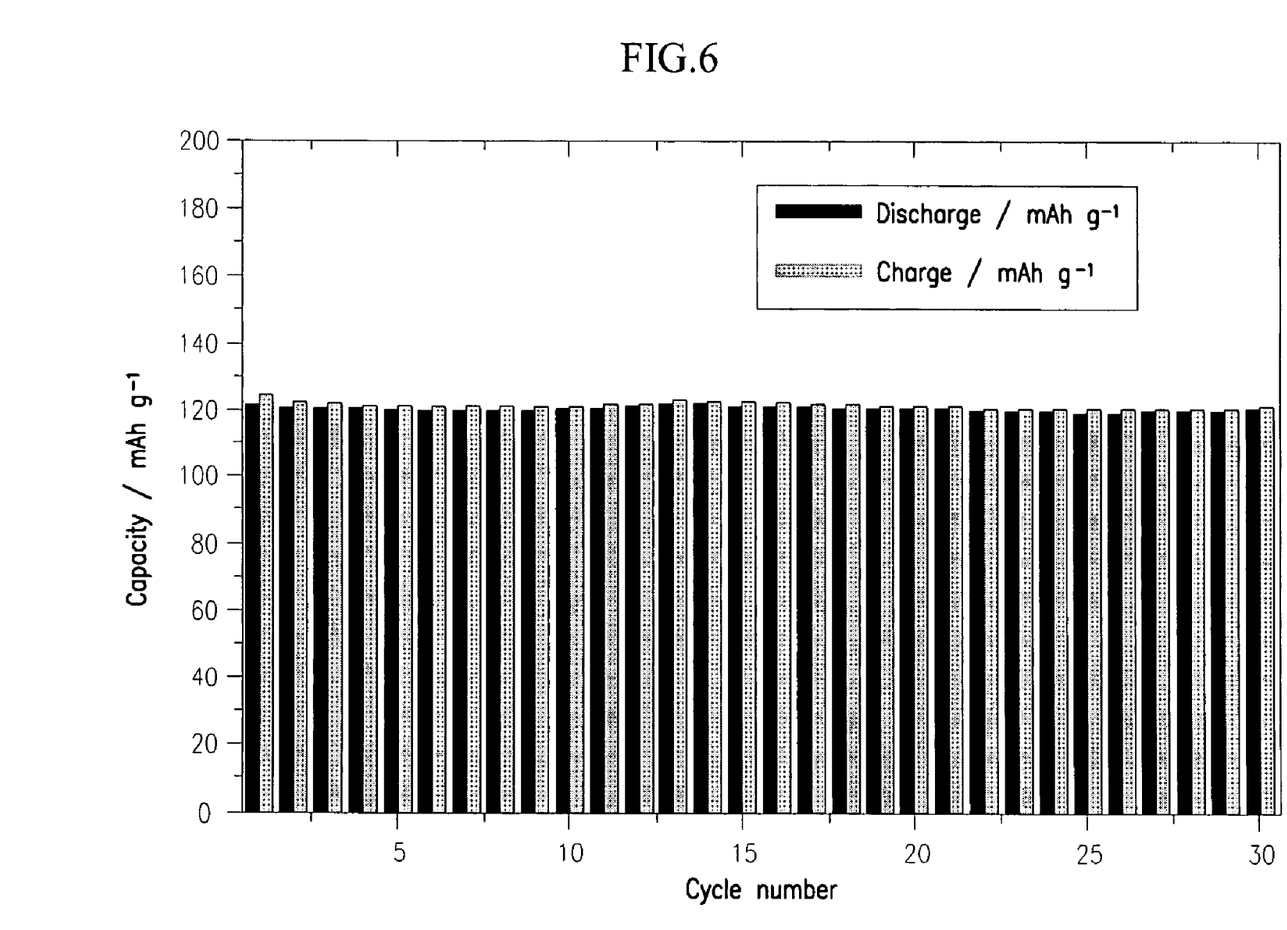
FIG. 6 is a graph of constant current cycling of the batteries comprising the electrodes prepared according to Example 1 at 0.1 C-rate.
Figure 7:
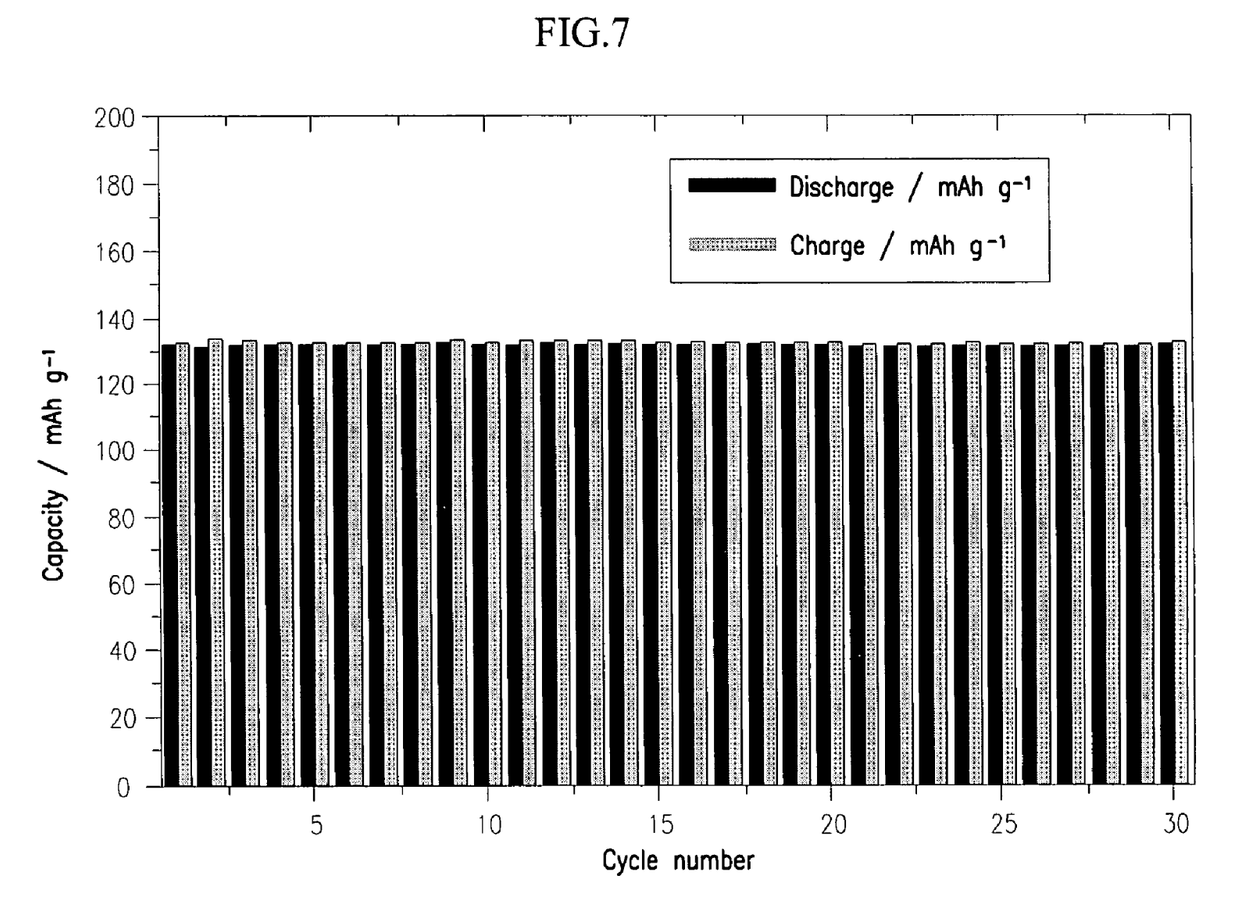
FIG. 7 is a graph of constant current cycling of the batteries comprising the electrodes prepared according to Example 1 at 10 C-rate.

FIG. 6 is a graph of constant current cycling at 0.1 C-rate, and FIG. 7 is a graph of constant current cycling at 10 C-rate.

Charge and discharge in the charge- and discharge-cycling test of FIG. 6 and FIG. 7 correspond to the lithiation and de-lithiation process of the $Li_4Ti_5O_{12}$ electrode, respectively.

FIG. 6 shows that the electrode of the present invention displays a superior battery property that maintains an average battery capacity of 130 mAh/g to 30 cycles, and FIG. 7 also shows a stable charge- and discharge-cycling.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing an electrode which comprises a step of preparing a layer of active material, a layer of conductive material, or a composite layer including an active material and a conductive material onto the surface of an electrode substrate using a substrate induced coagulation (SIC) coating method,
    wherein the electrode comprises an active material layer and a conductive material layer attached to the surface of the electrode substrate by the polyelectrolyte, and
    wherein the electrode includes a configuration wherein the electrode includes the active material layer and the conductive material layer alternatingly arranged one or more times; or a configuration wherein the electrode comprises a composite layer of active material and conductive material attached to the surface of the electrode substrate by a polyelectrolyte.

2. The method of preparing an electrode according to claim 1, wherein the electrode substrate is at least one selected from the group consisting of stainless steel, copper, titanium, aluminum, and ITO.

3. The method of preparing an electrode according to claim 1, wherein the active material is at least one selected from the group consisting of lithium titanate, lithium cobaltate, and lithium manganate.

4. The method of preparing an electrode according to claim 1, wherein the conductive material is at least one selected from the group consisting of carbon black and activated carbon.

5. The method of preparing an electrode according to claim 1, wherein the SIC coating method comprises the steps of:
    a) conditioning the surface of the electrode substrate with a conditioning solution comprising a first solvent and the polyelectrolyte; and
    b) treating the conditioned surface of the electrode substrate with:
        i) an active material, conductive material, or their mixture;
        ii) a second solvent;
        iii) a surfactant; and
        iv) a dispersion containing an electrolyte.

6. The method of preparing an electrode according to claim 5, wherein the polyelectrolyte is at least one polymer substance selected from the group consisting of:
    i) water-soluble polymer;
    ii) cationically charged polyelectrolyte;
    iii) uncharged water-soluble macromolecule; and
    iv) anionically charged high molecular weight material.

7. The method of preparing an electrode according to claim 5, wherein:
    i) the water-soluble polymer is at least one selected from the group consisting of gelatin, polyacrylates carrying a certain number of ammonium groups, and albumins;
    ii) the cationically charged polyelectrolyte is at least one selected from the group consisting of copolymers of acrylamides or methacrylamides with salts, and quaternary products of aminoacrylates or other polyelectrolytes carrying simple or substituted ammonium groups;
    iii) the uncharged water-soluble macromolecule is at least one selected from the group consisting of polyacrylamides, polyvinylpyrrolidones, polyvinylalcohols, polyethylene glycols, polyethylene glycol ether, epichlorohydrin-imidazole adduct, polyvinyl imidazoles, polysaccharides selected from the group consisting of agar, starch, pectin, and dextran, and sugar polymer such as alginic acid; and iv) the anionically charged high molecular weight material is at least one selected from the group consisting of sodium salts of carboxymethylcellulose, sodium salts of alginic acid, a copolymer of mannuronic acid and glucuronic acid, alkali salts of polycarboxylic acid such as polyacrylic acid, and polyvinylphosphoric acid.

8. The method of preparing an electrode according to claim 5, wherein the conditioning solution comprises 0.001 to 10 (w/w) % of the polyelectrolyte.

9. The method of preparing an electrode according to claim 5, wherein the dispersion comprises 0.05 g/L to 10 g/L of active material, conductive material, or a composite of these, 10 mM/L to 100 mM/L of surfactant, and 0.01 mole/L to 0.1 mole/L of electrolyte.

10. The method of preparing an electrode according to claim 1, wherein the electrode is used in a battery, a supercapacitor, or a fuel cell.

11. The method of preparing an electrode according to claim 1, wherein 5 the active material layer has a thickness of 10 nm to 10 µm and the conductive material layer has a thickness of 10 nm to 5 µm.

12. The method of preparing an electrode according to claim 1, the composite layer has a thickness of 10 nm to 10 µm.

* * * * *